Aug. 7, 1934.   J. U. RILEY   1,969,184
BROILER, TOASTER, AND THE LIKE
Filed April 8, 1932
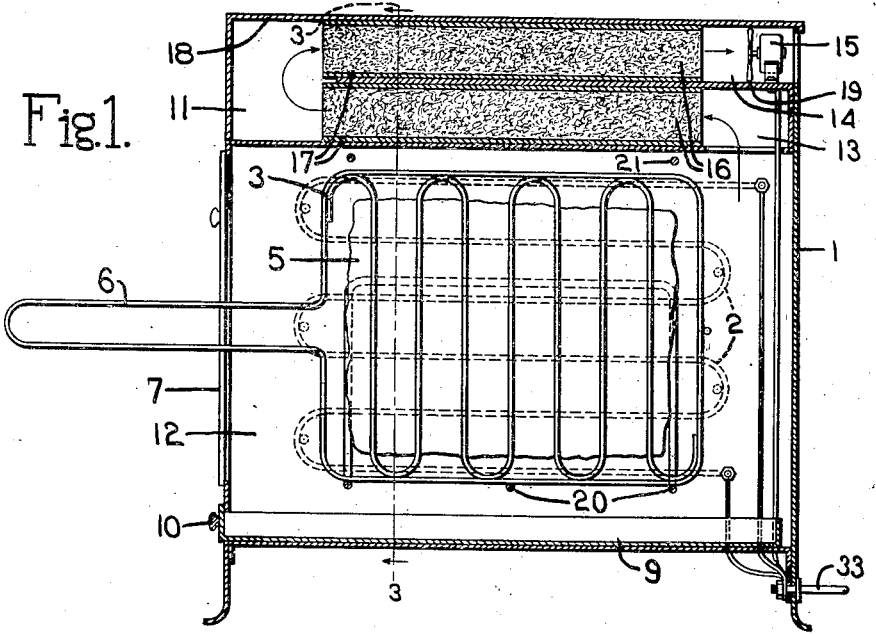
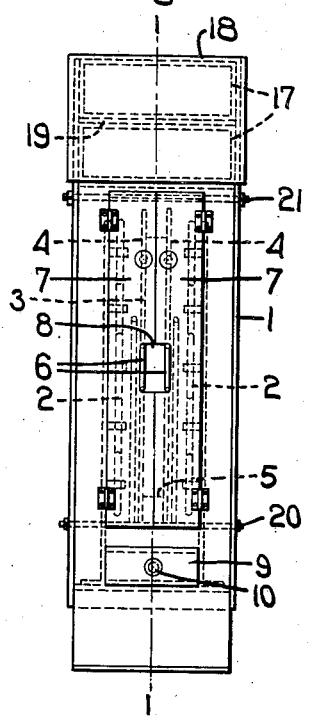
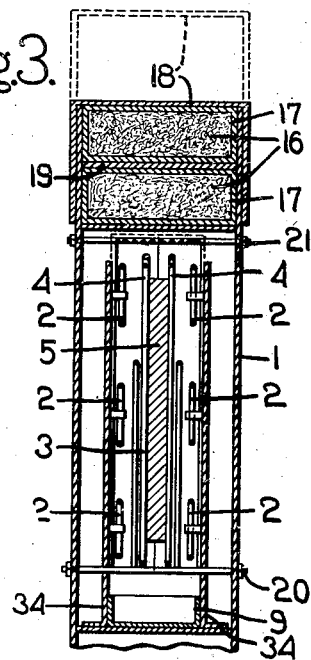
Inventor.
John U. Riley
by Heard Smith & Tennant
Attys Patented Aug. 7, 1934

1,969,184

UNITED STATES PATENT OFFICE 1,969,184

BROILER, TOASTER, AND THE LIKE

John U. Riley, Cohasset, Mass.

Application April 8, 1932, Serial No. 604,014

3 Claims. (Cl. 53—5)

This invention relates to a cooking utensil which can be used for broiling steak, toasting bread and similar cooking operations and it has particular reference to a portable cooking utensil of this type which is adapted to be used on lunch counters and similar places where it is desirable to be able to broil steak or make toast or perform similar cooking operations on a small scale without creating any unpleasant cooking odors or smoke in the room.

The object of my invention is to provide a cooking utensil of this type which is constructed with deodorizing means so that when it is used there will be no cooking odors or smoke issuing from the utensil.

The utensil comprises a housing having within it heat-generating means for cooking the food and also means for supporting the slice of meat or slice of bread in proper position to be cooked by the heat-generating means, which housing is provided with an egress duct through which any gases or smoke generated in the cooking operation and the cooking odors are discharged from the housing, and deodorizing or absorbent material placed in said duct which neutralizes or absorbs the cooking odors or smoke so that the utensil can be used freely without delivering any cooking odors or smoke into the room where the utensil is in use.

In order to give an understanding of the invention I have illustrated in the drawings a selected embodiment thereof which will now be described after which the novel features will be pointed out in the appended claims.

Fig. 1 is a sectional view on the line 1—1, Fig. 2;

Fig. 2 is a front view of the cooking utensil;

Fig. 3 is a section on the line 3—3, Fig. 1;

The cooking utensil comprises a portable housing which is indicated at 1 in which the cooking is performed. Situated within the housing is some suitable heat-generating means for performing the cooking operation and as herein illustrated such heat-generating means is an electric element, it comprising one or more coils 2 of resistance wire which is similar to that used in toasters and which is electrically connected in any appropriate way to terminals 33 to which any suitable attachment plug may be applied.

In the construction herein shown two such coils 2 are employed, each coil occupying a vertical plane and the two coils being separated from each other a sufficient distance to permit a slice of bread or a slice of meat to be introduced between them. The slice of meat or bread will preferably be retained in a suitable holder 3 during the cooking operation. This holder may be in the form of a grid having the two leaves 4 between which the slice of meat or bread 5 is received, said grid or holder being provided with the handle portion 6 by which it may be manipulated.

The housing is open at one end and the opening is adapted to be closed by swinging doors 7, the opening provided when the doors are open having a sufficient vertical dimension to permit the holder 3 to be introduced edgewise. The free edges of the door are cut away as shown at 8 to provide an opening through which the handle 6 may project when the doors are closed.

9 indicates a drip pan which is located beneath the holder and the purpose of which is to catch any drip which may occur while meat or similar food is being cooked. The end of the drip pan is exposed at the front of the housing and is provided with a knob 10 which facilitates its removal.

The housing is provided with suitable ways 34 in which the drip pan slides.

The housing is also provided with an egress duct 11, one end 13 of which communicates with the cooking chamber 12 and the other end 14 of which is open to the atmosphere. I will preferably employ a suction device, such for instance as an electric suction fan 15, for the purpose of establishing an air current through the egress duct 11 from the chamber 12 to the outlet end 14.

Situated in this egress duct 11 is some suitable deodorizing material which is constructed to neutralize, absorb or kill any cooking odors or smoke which may be generated in or escape from the chamber 12. Said deodorizing material is indicated at 16 and is preferably contained in suitable cartridges 17 which can be removably placed in the duct 11. Any suitable deodorizing and/or absorbent material, such as charcoal may be used, and when the utensil is in use the suction mechanism 15 will establish an air current from the cooking chamber 12 through the egress duct 11 to the atmosphere through the outlet 14 and as the air which is laden with cooking odors or which contains gases generated from the cooking operation passes through the deodorizing material 16 any obnoxious odors will be neutralized or absorbed so that the air which is delivered from the outlet 14 into the room will not produce in the room any unpleasant odors.

Provision is made for readily replacing any cartridges 17 whenever fresh deodorizing or absorbent material is required. For this purpose the housing is made with the removable cap or bonnet portion 18. When the bonnet is removed as shown in Fig. 3 the cartridges 17 are accessible so that they can be readily removed from the duct 11 and fresh cartridges placed in the duct.

In the construction shown the egress duct 11 is made with a return bend, this being accomplished by providing the housing with a horizontal partition 19 extending from the back end forwardly. With this construction the egress duct extends from the entrance end 13 horizontally beneath the partition 19, then around the left hand end of the partition and thence horizontally to the discharge end 14 above the partition 19. With this construction I may introduce one cartridge 17 into the duct beneath the partition 19 and another one into the duct 11 above the partition 19. When the bonnet or cap 18 is removed as shown in dotted lines Fig. 3 each of the cartridges is readily accessible and can be removed from the duct and replaced by a fresh cartridge.

In the construction shown the side walls of the housing are tied together by tie rods 20 and 21 and the lower tie rods 20 form a convenient means for supporting the grid 3 when it is introduced into the utensil.

I claim:

1. In a cooking utensil, the combination with a housing, of means within the housing for supporting a slice of meat, bread or the like, heat-generating means within the housing for cooking the slice in the holder, said housing having an egress duct leading therefrom, an open-ended cartridge containing deodorizing or absorbent material removably received in said duct and filling the latter at one portion thereof, an air-suction device in the exit end of the duct for withdrawing from the housing and through said duct and cartridge the gases and fumes generated by the cooking operation, a portion of the wall of said duct being removable to provide for removal and replacement of the cartridge.

2. In a cooking utensil, the combination with a housing, of means within the housing for supporting food to be cooked in slice form, heat-generating means within the housing for cooking said slice, said housing having an egress duct leading therefrom and presenting two parallel horizontal portions connected in series, an open-ended cartridge containing deodorizing or absorbent material filling each portion of the duct and removable as a unit therefrom, a suction fan in the exit end of the duct for withdrawing from said housing and through the duct and cartridges the gases and fumes generated by the cooking, a portion of the wall of the duct being removable to render the cartridges accessible for removal and replacement.

3. In a cooking utensil, the combination with a housing, of means within the housing for supporting food to be cooked in slice form, heat-generating means within the housing for cooking said slice, said housing having an egress duct leading therefrom, an open-ended cartridge containing deodorizing or absorbent material filling the duct at one point thereof and removable from the duct as a unit, the top of said duct being separable from the housing to permit the cartridge to be removed, and a suction fan at the exit end of the duct for withdrawing from the housing and through said duct and cartridge the gases and fumes generated by the cooking operation.

JOHN U. RILEY.